(12) United States Patent  (10) Patent No.: US 6,707,382 B2
Pedersen  (45) Date of Patent: Mar. 16, 2004

(54) CARD HOLDER SYSTEM

(76) Inventor: Søren Degnbol Pedersen, Lykken 11, DK-7860 Spøttrup (DK)

( * ) Notice: Subject to any disclaimer, the term of this patent is extended or adjusted under 35 U.S.C. 154(b) by 0 days.

(21) Appl. No.: 10/206,849

(22) Filed: Jul. 26, 2002

(65) Prior Publication Data

US 2003/0034891 A1 Feb. 20, 2003

Related U.S. Application Data

(63) Continuation of application No. PCT/EP01/00814, filed on Jan. 24, 2001.

(30) Foreign Application Priority Data

Jan. 26, 2000 (EP) .................................. 00101466

(51) Int. Cl.$^7$ .................................. G08B 13/14
(52) U.S. Cl. ............. 340/568.1; 340/571; 340/522; 340/692; 340/5.73; 340/600
(58) Field of Search .................. 340/568.7, 571, 340/522, 692, 5.73, 600; 235/380, 382.5; 705/64, 65, 73, 75, 76

(56) References Cited

U.S. PATENT DOCUMENTS

| 5,418,520 A | * | 5/1995 | Hirshberg | ................... 340/568 |
| 5,623,552 A | * | 4/1997 | Lane | ........................... 235/492 |
| 5,790,027 A | * | 8/1998 | Chern | ........................ 340/568 |
| 5,914,657 A |   | 6/1999 | Chen |   |
| 6,184,788 B1 | * | 2/2001 | Middlemiss et al. | ..... 340/568.7 |
| 6,400,270 B1 | * | 6/2002 | Person | .................... 340/568.7 |

FOREIGN PATENT DOCUMENTS

| EP | 0 284 351 | 3/1988 |
| FR | 2 634 039 | 7/1988 |
| GB | 2 236 000 A | 3/1991 |
| GB | 2 241 017 A | 8/1991 |
| GB | 2 317 484 A | 3/1998 |
| WO | WO 98/12675 | 3/1998 |
| WO | WO 99/23618 | 5/1999 |

* cited by examiner

*Primary Examiner*—Jeffery Hofsass
*Assistant Examiner*—Hung Nguyen
(74) *Attorney, Agent, or Firm*—Klein, O'Neil & Singh, LLP

(57) ABSTRACT

The invention is a card holder for credit cards or the like. The security system of the card holder prevents misuse of the credit cards that are lost by or stolen from the owner. A security system in the card holder initiates invalidation of the card, if the card is removed from the card holder without authorization.

14 Claims, 6 Drawing Sheets

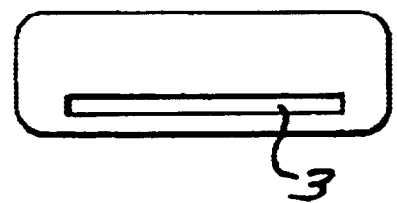
FIG.6C
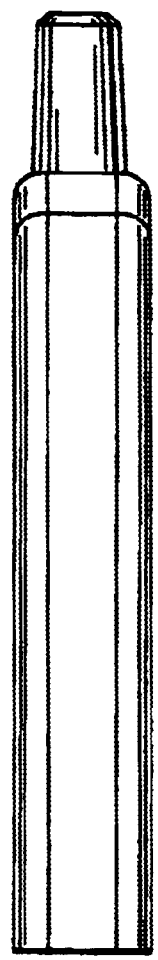
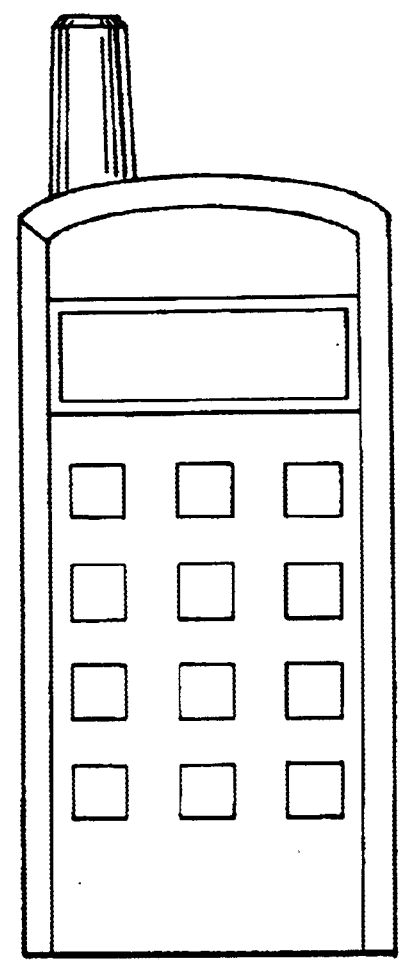
FIG.6B  FIG.6A

CARD HOLDER SYSTEM

This is a continuation of application No. PCT/EP01/00814 filed Jan. 24, 2001.

TECHNICAL FIELD OF THE INVENTION

The present invention relates to a card holder system. The invention relates further to a method for invalidation of a credit card that has been removed without authorization from said card holder system.

BACKGROUND OF THE INVENTION

Though the use of credit card is increasingly commonplace, a satisfactory securing of credit cards against unauthorized financial transactions has not yet been accomplished. These unauthorized transactions are partly due to theft of credit cards and partly because cards are lost, for example when cards by way of inattention are left inattentively after a financial transaction.

Different card holders for preventing loss of credit cards have been developed and are described in prior art. Common for a number of these card holders is that an alarm is started, if cards from the card holder after a certain time are not returned to the card holder, see for example U.S. Pat. No. 5,914,657.

However, even though the attention of the card owner is drawn to the fact that a card has been lost from the card holder, the owner will not immediately be aware of loss of the card holder itself.

In UK patent GB 2 236 000, an alarm system is disclosed, where a transmitter is carried by a person along with the wallet in which a corresponding receiver is placed. The receiver receives the transmitted signal from the transmitter as long as the receiver is in near vicinity of the transmitter. When the receiver fails to receive the signal due to a larger distance between the transmitter and the receiver, for example in the case of loss or theft of the wallet, the receiver activates a beeper.

Though this system takes care of the situation, where a wallet is lost, this system is not indicating the loss of a single credit card from the wallet.

DESCRIPTION OF THE INVENTION

The purpose of the present invention is to provide a card holder with a very high security level that prevents fraud of credit cards.

This purpose is achieved by a card holder as described by way of introduction characterised in that said card holder system further comprises invalidation means for receiving said signal and thereupon causing a card to be invalidated if said card is removed from said receptacle before deactivation of said security means.

The invention is a holder for cards, for example credit cards, smart cards, or other personal cards with data stored on it. The cards are inserted into receptacles in the card holder, for example through suitable slots. Once inserted into the card holder, sensing means, for example a magnetic sensor, registers that a card has been inserted into the receptacle. As a further step, security means can be activated. Once these security means are activated, it is not possible without authorization to remove a card from the holder without causing an invalidation of the card. The invalidation process is initialized by the emission of a signal from the sensing means and the receipt of that signal by the invalidation means. The invention, therefore provides a safe protection against fraud of credit cards or the like. Cards in the holder are protected even when the complete card holder has been lost or stolen, because no card can be removed from it unauthorized without invalidation of the card.

In another embodiment of the invention, the card holder system is characterized in that said activation and deactivation of said security means for a card in a receptacle can be carried out on at least three levels, where the first level comprises full deactivation of said security means to allow removal of said card from said receptacle, where the second level comprises partly deactivation of said security means to allow said card to be removed from said receptacle, but where an alarm after a predetermined time indicates that a card has been removed from said receptacle.

The card holder can be used without activation of the security means. This way, the card holder functions solely as a card wallet without the security options that the invention provides. At full activation, a card cannot be removed from the wallet without invalidation of the card as previously described. When a user wants to use one of the cards in the card holder, a second level of activation of the security means is chosen. In this level, a predetermined card can be removed from the card holder for a certain time, for example 210 seconds. After that time limit, an alarm is initiated to draw the attention of the user of the card holder to the fact that a card is missing. This level of activation is normally chosen by the user when a financial transaction is performed. It minimizes the risk of fraud by third persons, when a card is lost or stolen during or immediately after the financial transaction. As soon as the alarm starts, the user may return to the place of the financial transaction in order to search for the card. If the card is not to be found an invalidation can eventually be initiated. The relatively short time between the loss or theft of the card and the start of the alarm with a following invalidation effectively hinders unauthorized persons to misuse the card. The card holder can be used for different kinds of cards, an example is credit cards.

In a third embodiment of the invention, the alarm comprises means for creation of sound, vibrations and/or visual signals.

Normally the card holder will be carried in a pocket, so that sound like beeping will be part of the alarm. However, for deaf people, the alarm can be chosen the include vibrations. A third option includes visual signals as flashing or the like.

In a fourth embodiment of the invention, said invalidation means comprises magnetization means for erasing at least part of the information stored on a magnetic strip on a card.

Most credit card nowadays are equipped with magnetic strip on which data are stored for recognition of the card. If part of the information on that strip is lost, the card is not usable for financial transactions anymore. This fact is used in this embodiment of the invention, where during the unauthorized removal of the card from the card holder, a part or all of the information on the magnetic strip is erased by magnetization.

In a fifth embodiment of the invention, said invalidation means comprises a high frequency heater for destroying at least part of the magnetic strip on the card, whereby at least part of the information stored on said magnetic strip is erased.

In this embodiment of the invention, part or all of the information on the magnetic strip is erased by heating the strip at certain locations.

In a sixth embodiment of the invention, said card holder system comprises transmission means for transmitting said signal from said card holder system to an external receiver connected to external invalidation means.

In this embodiment of the invention, the card holder system is equipped with a transmitter, for example a radio signal transmitter or a telephone signal transmitter. Upon loss of a card, a signal is transmitted to an external receiver, whereupon invalidation of a card takes place. This feature is especially useful, if the card is lost during a financial transaction. Not only can the attention of the user be drawn to the fact that a card is lost, but if the card is not found, an automatic invalidation is taking place. In this case, the invalidation is not a direct destruction of the data on the card, but an electronic invalidation such that the card cannot be used in banks, etc. For example, the receiver can be connected to the computer system of the credit agency that issued the card or a data center connected to all financial institutions.

In a seventh embodiment of the invention, that said card holder system comprises an integrated computer with CPU and ROM.

Microcomputers can easily be incorporated in devices like a card holder according to the invention. Including a computer into the card holder offers a number of advantages as also will become apparent in the following embodiments.

In an eighth embodiment of the invention, said card holder system comprises data communication means for communication with the microprocessor in a smart card which is located in a receptacle.

Smart cards are cards with integrated microprocessors. These kind of cards may have a magnetic strip, but they do not need to. If these cards do have a magnetic strip, the previous described invalidation by erasing data on the magnetic strip may be sufficient. However, in order to employ the security system of the invention in an optimum way, a communication between the card holder and the smart card is desirable. If the card is not equipped with a magnetic strip, the communication with the microprocessor is essential.

In a ninth embodiment of the invention, said activation means comprises an alphanumeric keyboard for accepting security codes, activation orders and further alphanumeric input from the user of the card holder system.

In order to activate or deactivate the security system, a electronic combination lock can be used. An alphanumeric keyboard integrated in the card holder is usable for the input of number codes and other commands. Furthermore, the keyboard can be used for the input of further data, like the amount of money spent for a certain card or other information that is wanted by the user in connection with the card holder. Once equipped with a keyboard and a suitable memory and data unit, the card holder can be used as an organizer for financial transactions with credit cards.

In a tenth embodiment of the invention, said activation means comprises a fingerprint sensor for reading the fingerprint of the user for verification of the user's authorization to access cards in said card holder system.

This embodiment of the invention uses the fact that fingerprints are individual. As only a user who is recognized by the security system will be given authorization to take a card from the card holder, this kind of security system is to be regarded as extremely safe.

In an eleventh embodiment of the invention, said card holder system comprises display means for displaying information to the user.

In order to communicate data to the card holder and to ease the verification by the user of the data entered, a display is incorporated in the card holder. If the card holder, as mentioned above, is used as a financial organizer or the like, a display in the card holder is of vital importance.

In a twelfth embodiment of the invention, said card holder system further comprises terminal interface means for communicating data to an external computer system.

The card holder itself may be a relatively small device, eventually fitting into a pocket or maybe even a wallet. In order to use the data from the card holder in a more efficient and variable way, a transfer of the data from the holder to a computer system with higher capacity is foreseen in this embodiment of the invention. For example, the data transfer can be performed through a data bus, like special cables.

In a thirteenth embodiment of the invention, said terminal interface means comprises an infrared data transmission port.

This way, a cable can be omitted, which facilitates the use of the card holder as an organizer connected to a computer system with higher capacity.

In a fourteenth embodiment of the invention, said card holder system comprises an integrated mobile telephone.

By integrating a mobile telephone into the card holder, the card holder not only is a more versatile tool, but loss of cards can be signalled to an external receiver in a common and safe way, after which invalidation of the card can be initiated as described above. Integrating a mobile telephone into the card holder instead of other transmission means is preferred due to the approved technology and low production cost.

In a fifteenth embodiment of the invention, said card holder comprises a number of connected sections configured to be engage able to form a structure having the same general dimensions as a credit card, each section having a receptacle for a card. A metallic strip extends through said number of connected sections forming a loop around said receptacles. A mutual disconnection of the number of connected sections results in a breakage of said loop causing said invalidation means to invalidate all cards in the card holder system.

In case of intended fraud, an unauthorized person may be tempted to break the card holder in order to get hold of the cards without invalidation. However, if any section with receptacle is disconnected from the other receptacles in the other sections, the metallic strip is broken and for safety reasons, all cards are invalidated.

As an additional safety, the metal strip can extend through the cover lid of the power supply, for example a battery. To protect the card holder against unauthorized removal of the power supply, the cover lid of the power supply is included in the safety system. Thus, if the cover lid is removed without deactivation of the security system, all card are invalidated. As an alternative to a battery as a power supply, an electric accumulator in connection with solar cells is also possible.

BRIEF DESCRIPTION OF THE DRAWINGS

The invention is described in more detail in the following with reference to the accompanying drawings, wherein

FIG. 6 is a perspective view of a combined card holder and mobile telephone.

DETAILED DESCRIPTION OF THE INVENTION

Figure 1:
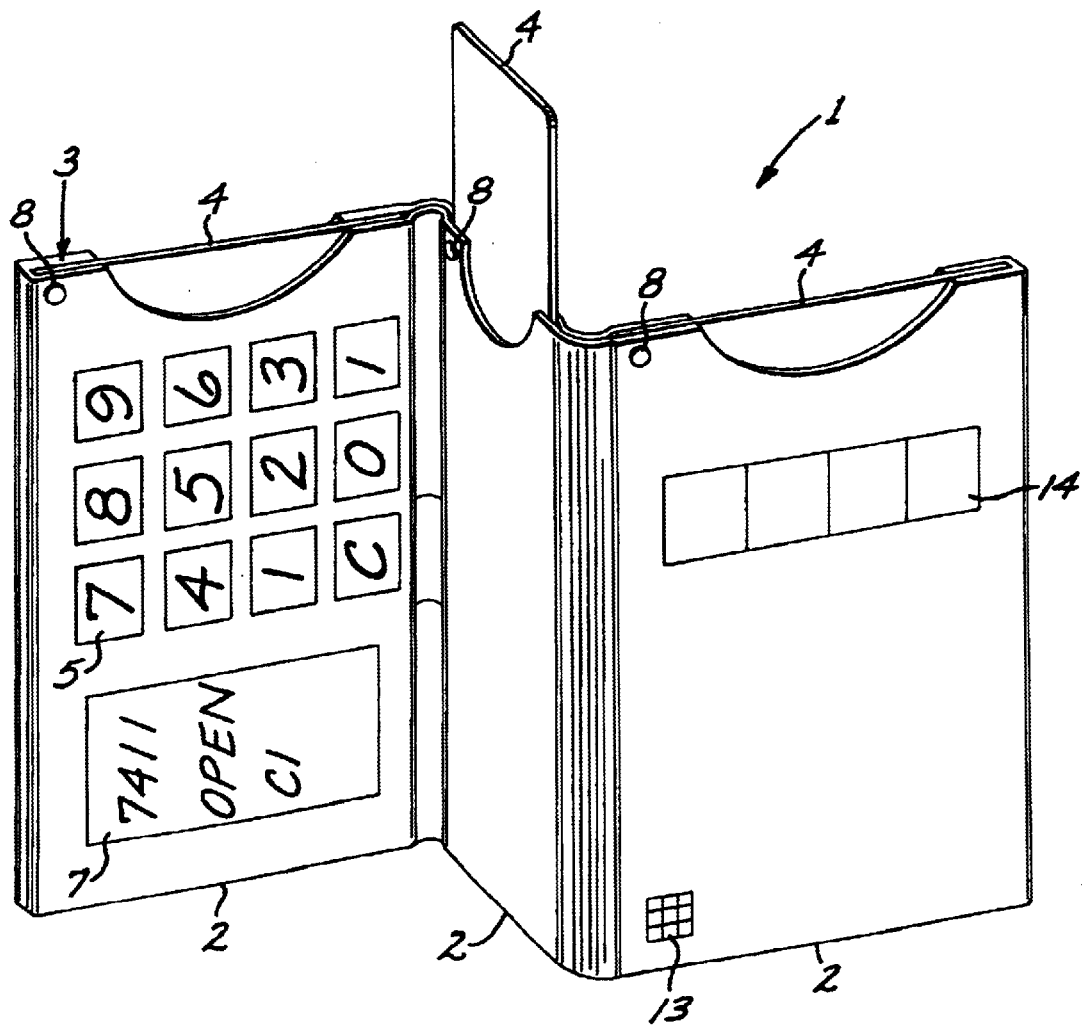
FIG. 1 is a perspective view of a card holder according to the invention.

FIG. 1 is a card holder 1 according to the invention. In this embodiment of the invention, the card holder 1 is chosen with three sections 2. Each section 2 is equipped with a receptacle 3 for a card 4. Inside the receptacle 3, a sensor registers the presence of a card 4 in the receptacle 3. Once a card 4 is inserted into the receptacle 3, the security means can be activated by data input, for example a code, from the keyboard 5. A display 7 helps the user to verify the input of the right code. Furthermore, the keyboard 5 and the display 7 are used for other information transfer between the user and the card holder 1.

Whether a card 4 can be validly removed from a receptacle 3 is indicated by an indicator 8, for example a two or three color LED (light emitting diode).

A sound generator 13 that can be used for the alarm or for other audio indications is also incorporated in the card holder 1.

The keyboard 5 is formed with a surface that also blind people can read the numbers on the keyboard. Optionally, the information from the card holder to the user is given by means of a voice generator connected to the sound generator 13. This option is a feature to allow also blind people to use the card holder with all the security features. As a further help for blind people, the receptacles have indication means on the outer surface in order to indicate, with which orientation cards should be inserted.

The power supply can be a lithium battery or, preferably, a combination of solar cells 14 and an electric accumulator.

Figure 2:
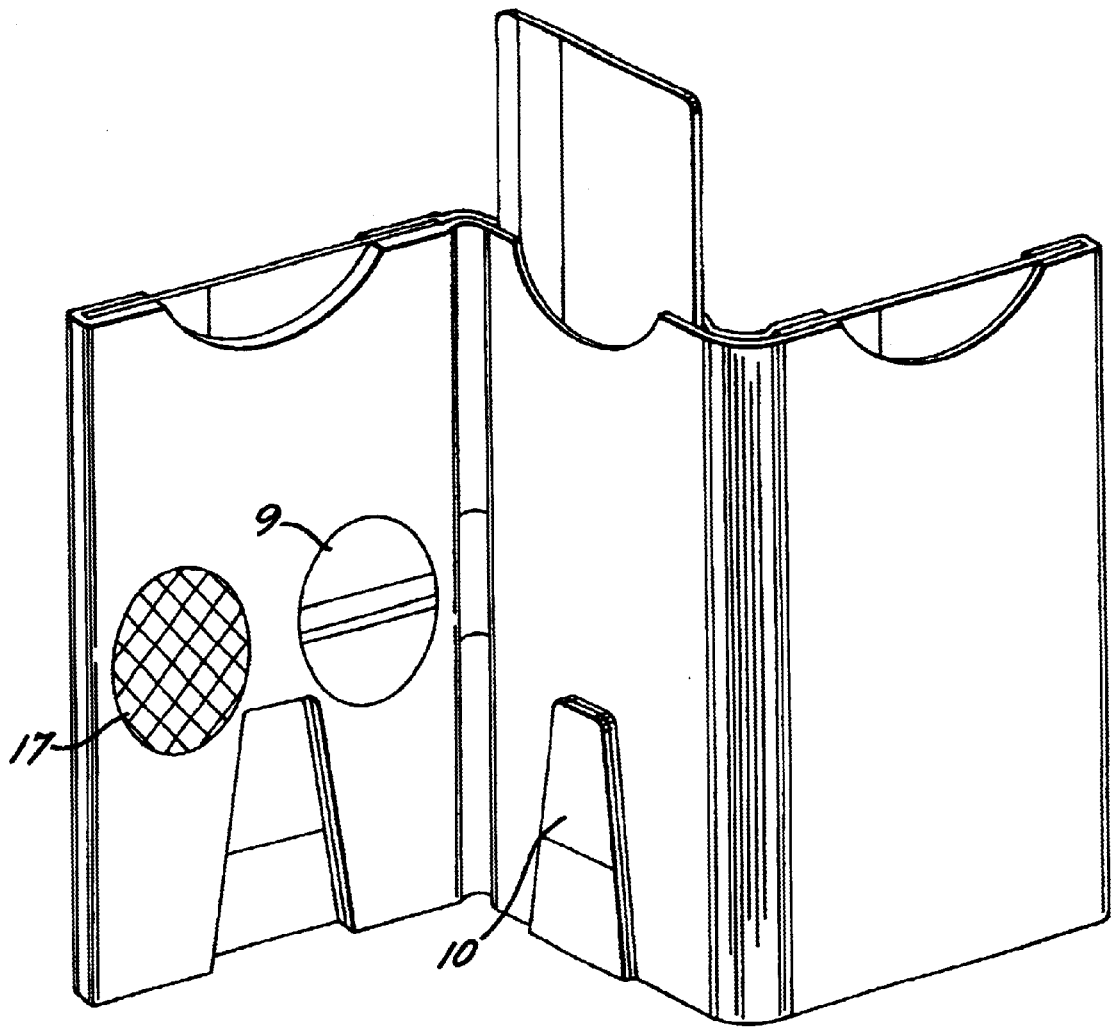
FIG. 2 is a perspective view of the card holder in FIG. 1 as seen from the opposite side.

FIG. 2 is a side view of the card holder as seen from the opposite side. For optimal safety, a fingerprint sensor 17 is included in the card holder 1. When the security system is activated, a card can only be removed from the card holder 1 without invalidation, if the authorized user is verified by his fingerprint.

The cover lid 9 the power supply is integrated in the security system and cannot be removed unauthorized without causing an invalidation of the cards.

For convenience, the card holder 1 can be equipped with a hook 10, where the user can store money bills or paper messages. This way, the card holder 1 can be used as a wallet.

Figure 3:
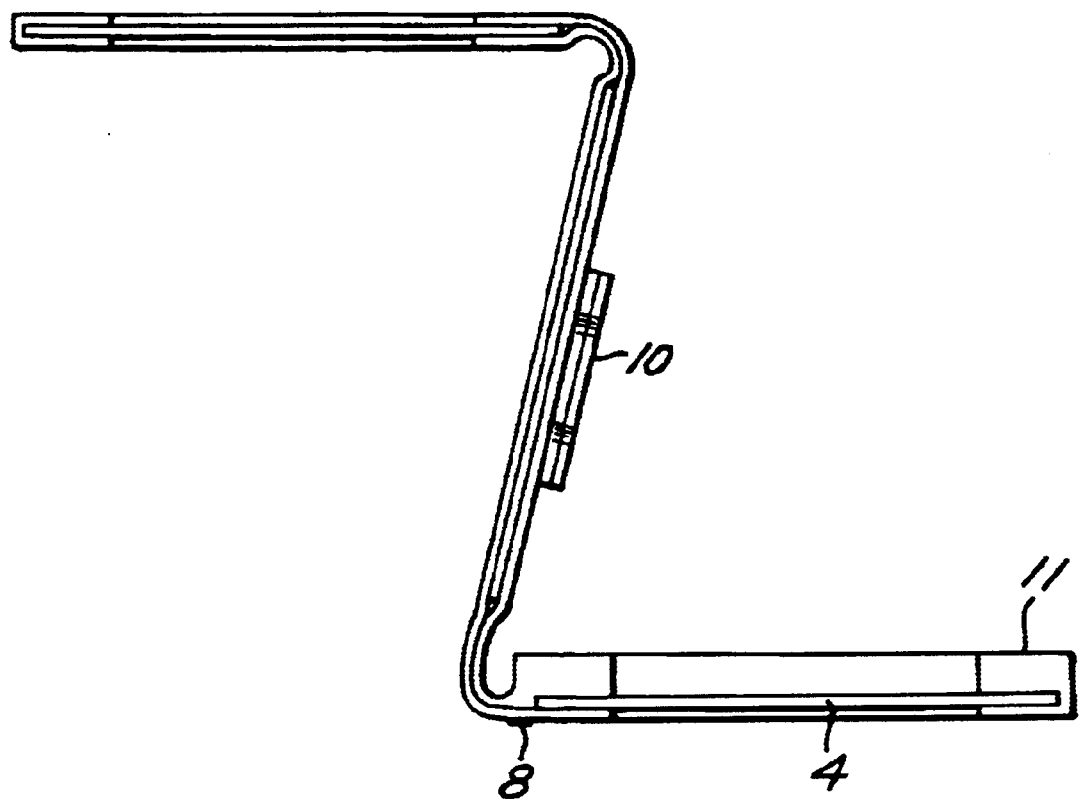
FIG. 3 is the card holder from FIG. 1 as seen from above.

FIG. 3 shows the card holder 1 as seen from above. The section 11, where the power supply is included, is thicker than the other two sections. In this section, alarm means, an eventual transmitter, a computer, or/and a mobile telephone are integrated. A necessary antenna can be invisibly integrated inside the holder.

Figure 4:
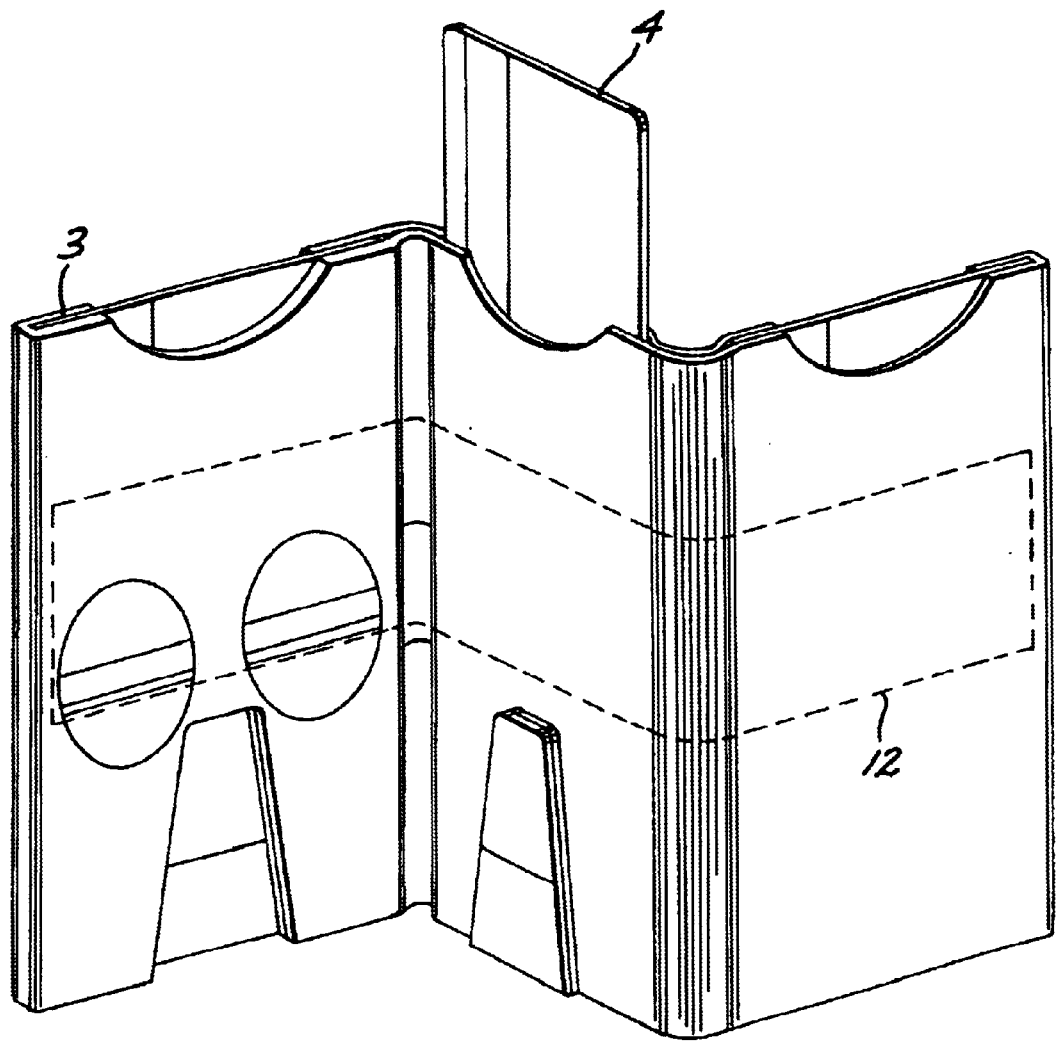
FIG. 4 is a transparent view of the card holder showing a metallic strip extending through the sections.

FIG. 4 is a transparent view of the card holder 1, where a metallic strip 12 is seen which extends through the three sections 2. In case of intended fraud, an unauthorized person may be tempted to break the card holder 1 in order to get hold of the cards 4 without invalidation. However, if any section 2 with receptacle 3 is disconnected from the other receptacles 3 in the other sections 2, the metallic strip 12 is broken and for safety reasons, all cards 4 are invalidated. In the figure, only a metallic strip on the back of the card holder is shown; however, a corresponding strip extends through the front side as well. Alternatively, a strip may extend from the back to the front side and back to the back side again to close a loop.

Figure 5:
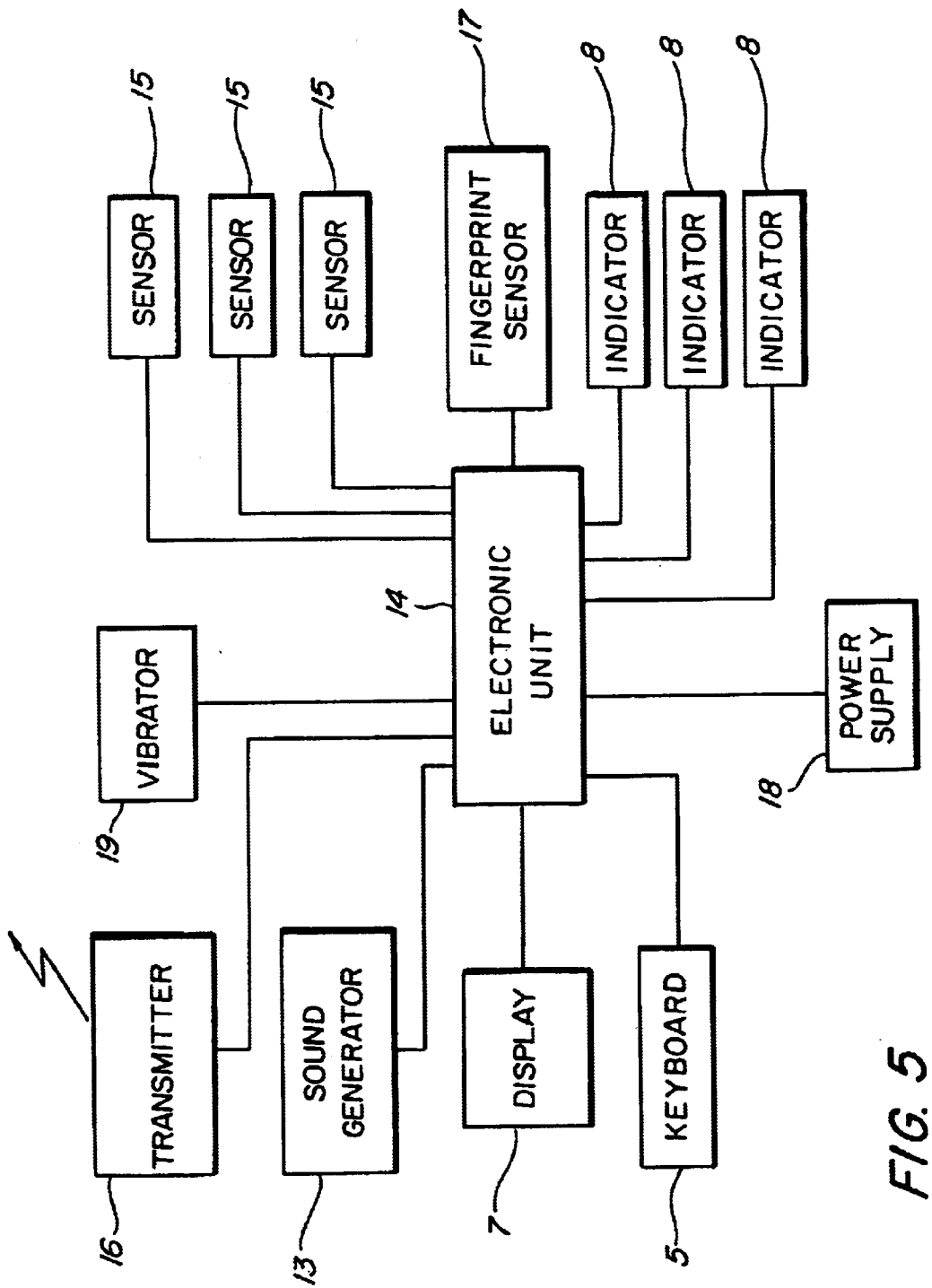
FIG. 5 is a diagram of the connection between an electronic unit, for example microprocessor, CPU, and the other security components in the card holder.

FIG. 5 is a diagram of the connection between an electronic unit 14, for example microprocessor, CPU, and the other security components in the card holder. The necessary electricity is supplied by a power supply 18. The electronic unit 14 receives input from the keyboard 5 and shows output messages to the user on the display 7. When cards 4 are inserted in any of the receptacles 3, the electronic unit 14 by help of the sensors 15 registers the presence of a card 4 in the receptacle 3. Thereupon, a standard message is displayed on the display 7 where the user is asked to confirm the activation of the security means. Once confirmed by input from the user, either by input through the keyboard 5, or by placing a finger on the fingerprint sensor 17, the security system is activated.

It is possible to activate the security means for each receptacle 3 independently of each other. For example, it can be chosen by the user that the security means for different receptacles 3 are activated and/or deactivated by different codes from the keyboard 5. This way, different persons can share a card holder 1 in a way such that the different person may have access only to a predetermined number of cards 4 in the card holder 1.

Also the fingerprint sensor 17, is usable to differentiate between different users. For example, if a first person has inserted the first card 4 into the first receptacle 3 and then with the fingerprint sensor 17 activated the security means for that receptacle 3, a second person may not be allowed to deactivate the security means for that receptacle 3. But he might be allowed to insert a second card 4 into the second receptacle 3, activate and deactivate the security means for the second receptacle 3.

Whether a card is secured in the respective receptacle is indicated by light emitting diodes 8 connected to the electronic unit 14.

If the sensors register that a card is being removed from the card without authorization, the sound generator 13 is activated, the LED's 8 are flashing, a vibrator 19 is activated, and a warning message is displayed on the display 5. If the card 4 is pulled out of the receptacle 3, invalidation means 15 are activated to invalidate the card 4, for example by de-magnetizing part of the magnetic strip on the card or by heat treatment of the magnetic strip. In case that the card 4 is a smart card or the like with a microprocessor and/or without a magnetic strip, the microprocessor of the smart card 4 is changed in a way making it impossible to use the card 4 further for financial transactions. An alternative for the invalidation of the card inside the card holder is transmission of a signal from a transmitter 16 in the card holder to an external receiver, whereupon the card will be registered in a data center as not usable for financial transactions any more.

The microprocessor 14 is only accessible electronically if a special encrypted code is entered into the microprocessor. If this code is not entered before access to the microprocessor, the content in the microprocessor is erased so that the microprocessor is of no further use. For different features on the microprocessor, different encrypted codes are possible.

A possible standard microprocessor programmed for the present invention works at a frequency 4.5 MHz. By special means comprising capacitors and frequency regulating crystals, the working frequency for this standard processor has been changed to 1.5 MHz. This way, the lifetime of a power supply, for example a battery, is enhanced substantially The number of receptacles in the above example has been chosen to be three, however, other numbers are possible. Different materials for the housing of the card holder are possible, but metal or polymer or a combination thereof is preferred.

If a mobile telephone is incorporated in the card holder, as shown in the embodiment in FIG. 6, the transmission signal will be chosen to be a telephone signal. In the illustrated embodiment, only one receptacle is shown, but also more receptacles are possible.

What is claimed is:

1. A card holder system comprising:

a power supply;

a plurality of individual card receptacles for receiving and holding cards;

sensing means associated with each of said receptacles for determining the presence or the absence of a card therein;

security means operably connected to each of said sensing means for emitting a signal caused by the removal of a card from any of said receptacles;

activation means for activation and deactivation of said security means; and invalidation means for receiving said signal and thereupon causing a card to be invalidated if said card is removed from said receptacle before deactivation of said security means;

wherein said activation and deactivation of said security means for a card in a receptacle can be carried out on at least three levels;

wherein the first level comprises full deactivation of said security means to allow removal of said card from said receptacle, the second level comprises partly deactivation of said security means to allow said card to be removed from said receptacle, in which an alarm after a predetermined time indicates that a card has been removed from said receptacle, and wherein the third level comprises the invalidation of said card if said card is removed from said receptacle before deactivation of said security means.

2. A card holder system according to claim 1 characterized in that said alarm comprises means for creation of sound, vibrations and/or visual signals.

3. A card holder system according to claim 1 characterized in that said invalidation means comprises magnetization means for erasing at least part of the information stored on a magnetic strip on a card.

4. A card holder system according to claim 1 characterized in that said invalidation means comprises a high frequency heater for destroying at least part of the magnetic strip on a card, whereby at least part of the information stored on said magnetic strip is erased.

5. A card holder system according to claim 1 characterized in that said card holder system comprises transmission means for transmitting said signal from said card holder system to an external receiver connected to external invalidation means.

6. A card holder system according to claim 1 characterized in that said card holder system comprises an integrated computer with CPU and ROM.

7. A card holder system according to claim 1 characterized in that said card holder system comprises data communication means for communication with the microprocessor in a smart card which is located in a receptacle.

8. A card holder system according to claim 1 characterized in that said activation means comprises an alphanumeric keyboard for accepting security codes, activation orders and further alphanumeric input from the user of the card holder system.

9. A card holder system according to claim 1 characterized in that said activation means comprises a fingerprint sensor for reading the fingerprint of the user for verification of the user's authorization to access cards in said card holder system.

10. A card holder system according to claim 1 characterized in that said card holder system comprises display means for displaying information to the user.

11. A card holder system according to claim 1 characterized in that said card holder system further comprises terminal interface means for communicating data to an external computer system.

12. A card holder system according to claim 11 characterized in that said terminal interface means comprises an infrared data transmission port.

13. A card holder system according to claim 1 characterized in that said card holder system comprises an integrated mobile telephone.

14. A card holder system according to claim 1 characterized in that said card holder comprises a number of connected sections configured to be engage able to form a structure having the same general dimensions as a credit card, each section having a receptacle for a card, that a metallic strip extends through said number of connected sections forming a loop around said receptacles, and that a mutual disconnection of the number of connected sections resulting in a breakage of said loop causes said invalidation means to invalidate all cards in the card holder system.

* * * * *

UNITED STATES PATENT AND TRADEMARK OFFICE
CERTIFICATE OF CORRECTION

PATENT NO. : 6,707,382 B2 Page 1 of 1
DATED : March 16, 2004
INVENTOR(S) : Søren Degnbol Pedersen It is certified that error appears in the above-identified patent and that said Letters Patent is hereby corrected as shown below:

Column 6,
Line 37, the word "card" should be changed to -- receptacle --.

Signed and Sealed this

First Day of June, 2004

JON W. DUDAS
*Acting Director of the United States Patent and Trademark Office*